United States Patent [19]
Mraz

[11] Patent Number: 5,911,300
[45] Date of Patent: Jun. 15, 1999

[54] FLEXIBLE MOBILE CONVEYOR WITH MULTIPIVOTAL LINKAGE

[76] Inventor: Dennis Mraz, 410 Jessop Avenue, Saskatoon, Saskatchewan, Canada, S7N 2S5

[21] Appl. No.: 08/637,964

[22] Filed: Apr. 25, 1996

[51] Int. Cl.⁶ .................................................. B65G 41/00
[52] U.S. Cl. ............................................................ 198/303
[58] Field of Search ................................. 198/300, 303, 198/312, 313, 588, 812

[56] References Cited

U.S. PATENT DOCUMENTS

| | | | |
|---|---|---|---|
| 3,343,651 | 9/1967 | Oury et al. | 198/588 |
| 3,598,224 | 8/1971 | Oury | 198/313 X |
| 4,031,997 | 6/1977 | Nelson | 198/303 X |
| 4,646,906 | 3/1987 | Wilcox, Jr. et al. | 198/303 |
| 4,776,445 | 10/1988 | Zitz et al. | 198/303 |
| 5,234,094 | 8/1993 | Weyermann et al. | 198/588 X |

*Primary Examiner*—James R. Bidwell
*Attorney, Agent, or Firm*—Morgan & Finnegan LLP

[57] ABSTRACT

A flexible mobile conveyor includes a plurality of modular conveyors or conveyor carriages interconnected end-to-end by pivotal joint means to form a train, at least one end of each modular conveyor or carriage telescopically mounted with respect to the pivotal joint means, each pivotal joint means pivotally supported by an intermediate axle with wheels, and a mechanical linkage disposed between the axles in order to maintain a, predetermined position of each intermediate axle with respect to modular conveyors at each horizontal pivot means, in order to maintain relatively accurate tracking.

8 Claims, 3 Drawing Sheets

FLEXIBLE MOBILE CONVEYOR WITH MULTIPIVOTAL LINKAGE

BACKGROUND OF THE INVENTION

1. Field of the Invention:

The present invention relates generally to the field of conveying machines used in mines and, more specifically, to flexible mobile conveyor systems.

2. Description of the Related Art:

Mobile conveyor systems are known in the mining field to include a series of interconnected and articulated conveyors, or continuous flexible conveyors supported by a series of interconnected and articulated support vehicles. It is desirable that such conveyors are relatively long and highly flexible in all, horizontal, vertical and transverse planes, and capable of relatively accurate tracking within confined spaces of the mines, while simultaneously conveying bulk material.

For example, U.S. Pat. No. 3,863,752 to Sibley discloses a plurality of carriage units which are connected to facilitate end-to-end articulated movement, while supporting an endless conveyor along substantially the full length of the interconnected carriages.

U.S. Pat. No. 4,256,213 to Shaw et al. discloses a mobile chain conveyor having plurality of connected carriages which are operative to track each other during traversing of a mine floor surface. Each carriage has driven support wheels intermediate its length and supports an endless chain conveyor and associated drive means.

U.S. Pat. No. 4,951,801 to Mraz discloses a mobile conveyor apparatus comprising a plurality of pivotally interconnected modular carriages each of which has a pair of transversely aligned support wheels intermediate its longitudinal length so as to track behind the wheels of the preceding carriage, and support an endless belt conveyor including belt guidance means and belt drive means.

In the aforementioned Shaw et al. and Mraz patents, a relatively accurate tracking of carriages behind one another is achieved by transversely aligned support wheels intermediate the length of each carriage. The position of wheel supports intermediate the length of modular carriages Limits their length, as the use of longer vehicles makes the train less stable, especially where the floor in uneven, which is normal in mines.

Other flexible mobile conveyors currently in the use employ mobile supports proximal to the ends of modular conveyors or carriages, which leads to incorrect tracking of such train and requires either a manual steering of each mobile support or an exceedingly complex computerized system of sensors and actuators having an insufficient accuracy of tracking.

It would be highly desirable in a flexible mobile conveyor to position the mobile supports at or in proximity to the ends of individual modular conveyors or carriages and provide a mechanical linkage which would automatically assure an accurate tracking of such mobile supports one being the other.

SUMMARY OF THE INVENTION

An object of the present invention is to provide an articulated mobile support of a flexible mobile conveyor, with a mechanical linkage which enables a relatively accurate tracking.

Another object of the present invention is to provide articulated mobile supports of modular conveyors or carriages located in the proximity of their ends.

Yet another object of the present invention is to provide a flexible mobile conveyor with an articulated mobile support which is relatively simple to construct and operate.

In a preferred embodiment, a flexible mobile conveyor includes a plurality of modular conveyors or carriages interconnected end to end, each conveyor being pivotal about a vertical pivot axis of each horizontal pivot joint means and mounted telescopically with respect to the adjacent conveyor; a plurality of intermediate axles, each being pivotally connected to and having common pivot axis with corresponding horizontal pivot joint means; and a mechanical linkage disposed between intermediate axles for turning each intermediate axle in order to maintain a predetermined position of each intermediate axle to modular conveyors at each horizontal pivot.

These and other features and advantages of the present invention will become more apparent with reference to the following detail description and drawings.

DETAILED DESCRIPTION OF THE PREFERRED EMBODIMENT

Figure 1:
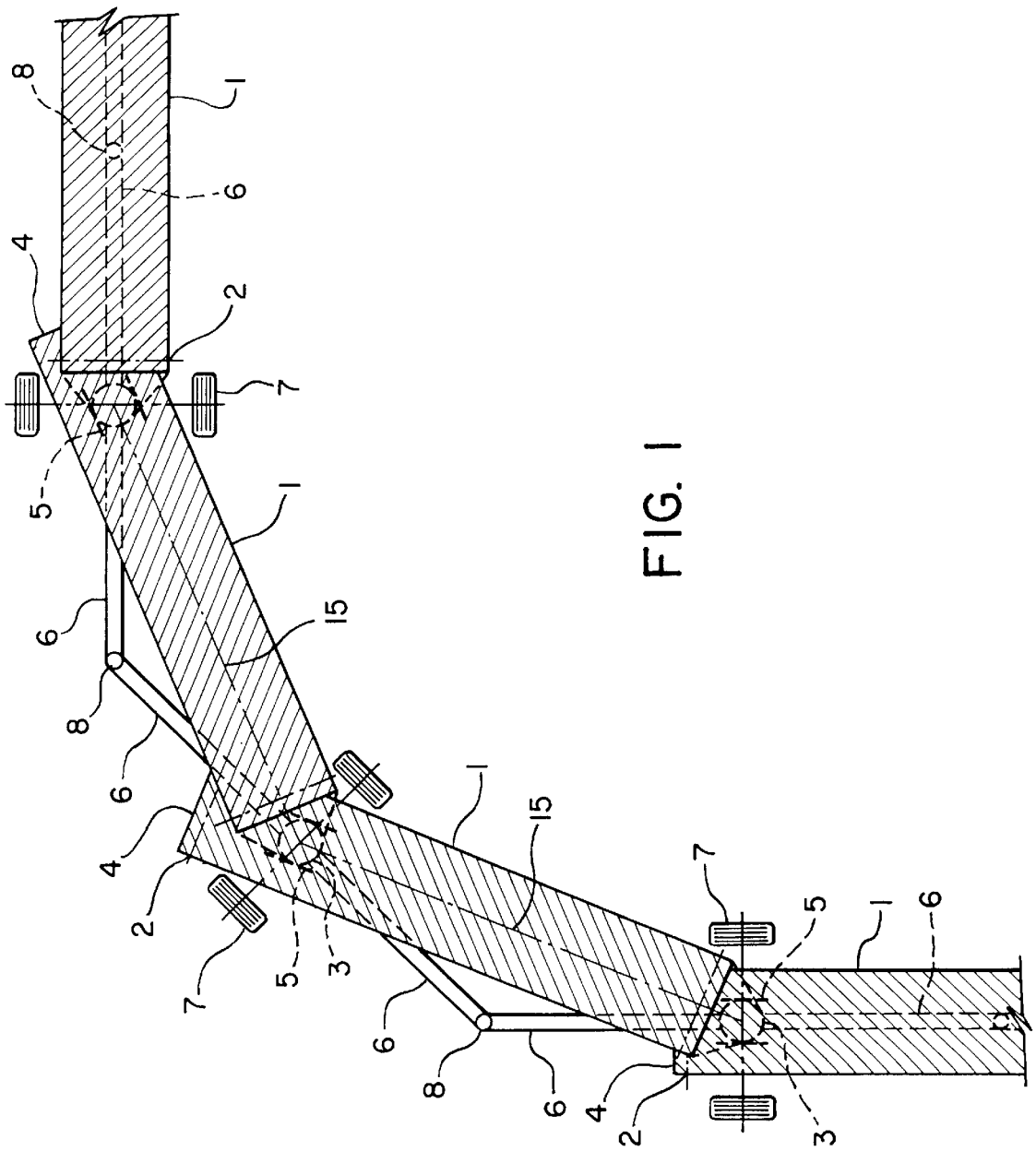
FIG. 1 is schematic top plan view showing a portion of a flexible mobile conveyor having a series of individual conveyors supported by a series of mobile supports interconnected by steering linkages.

Referring to FIG. 1, modular conveyors 1 are supported at each front end 2 on a pivot 3 and at each tail end 4 on a pivot 3 through a slide 5. Linkage bar 6 is rigidly connected to the intermediate axle 7 at a right angle. All linkage bars 6 are of the same length equal to one half of the distance between the intermediate axles when they are aligned in a straight line.

The linkage bars 6 are connected by a pivot 8. As the flexible mobile bridge conveyor is steered around a curve, linkage bars 6 maintain fixed distances between pivots 8 and axles 7 and the distance 15 between pivots 3 is reduced. In order to accommodate the shortening of the distance 15, the tail end of 4 of the modular conveyor 1 slides within the slide 5 under the front end 2 of the adjacent modular conveyor.

Figure 2:
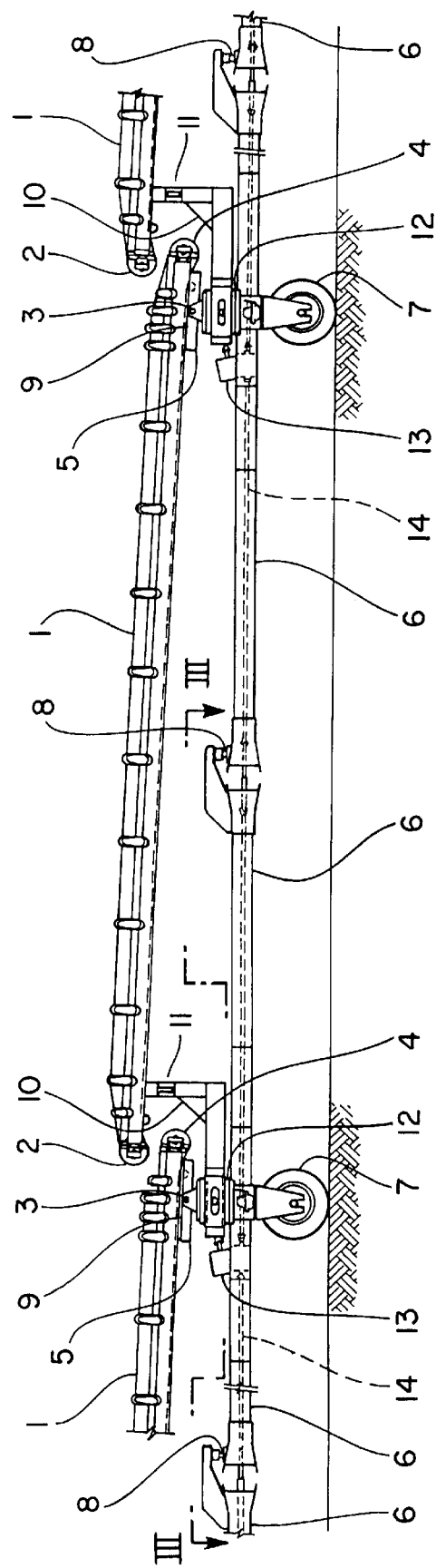
FIG. 2 is a side view of a portion of a flexible mobile conveyor with pivotally and telescopically mounted conveyors, and pivotally connected intermediate axles connected by a steering linkage.

Referring to FIG. 2, the tail end 4 of a modular conveyor 1 is mounted through a slide 5 on a bearing 9 of the pivot 3, which is in turn mounted on a support structure 10 of the front end 2 of the conveyor 1. Support structure 10 contains longitudinal pivot 11, which allows modular conveyors 1 to pivot longitudinally with respect to one another. Support structure 10 is mounted to bearings 9 and 12 of the pivot 3.

The intermediates axle 7 is mounted to a bearing 12. Linkage bars 6 are interconnected by pivots 8 at mid distance between intermediate axles 7. Each intermediate axle 7 is driven by axle drive 13, which is interconnected with adjacent axle drives through a drive line 14. The tail end 4 of the modular conveyor 1 slides within slide 5 as required, when the distance between pivots 3 is reduced.

Figure 3:
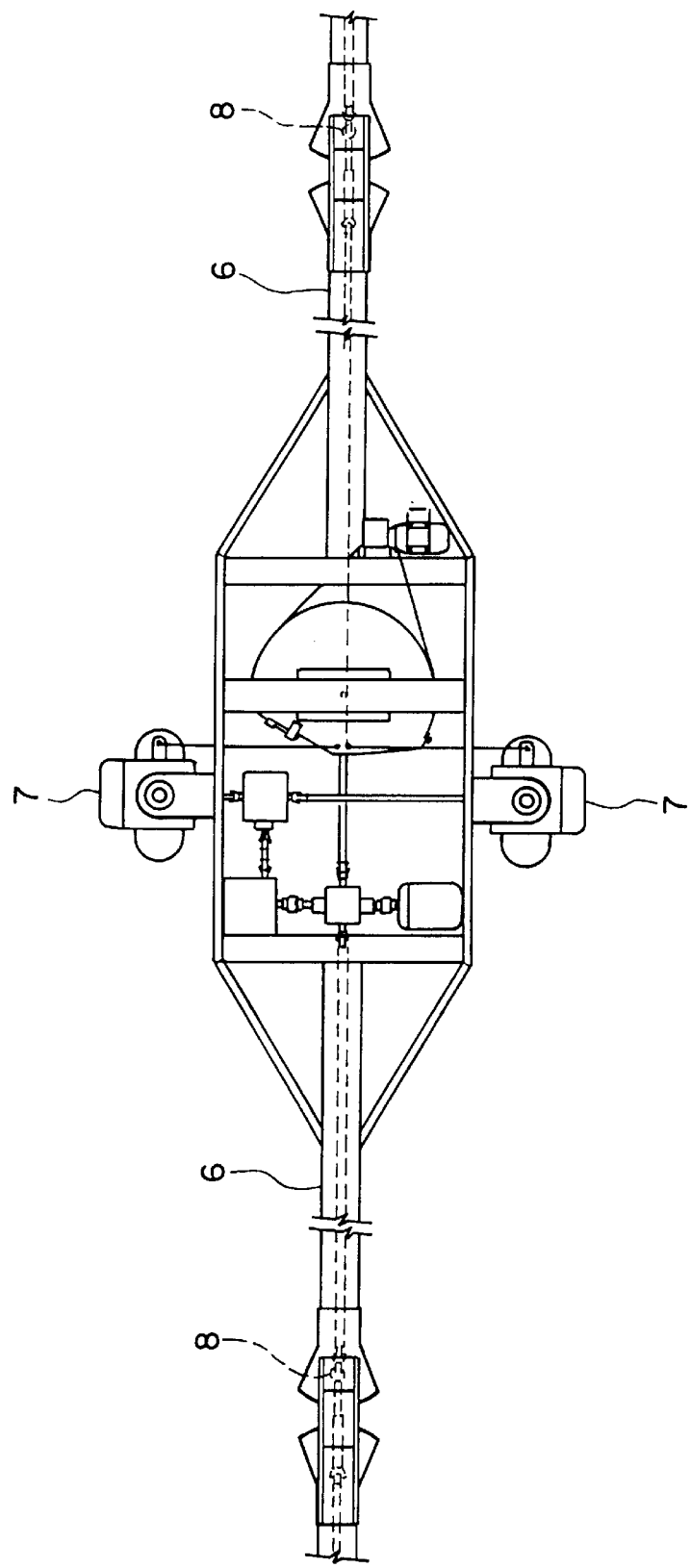
FIG. 3 a top plan view showing the detail of intermediate axles and a steering linkage.

Referring to FIG. 3, linkage bar 6 is rigidly connected to axle 7 at a right angle, while linkage bars e are pivotally connected by pivot 8.

What is claimed is:

1. A flexible mobile conveyor comprising:

a plurality of modular conveyors, each having a fixed end and a telescoping end;

a plurality of horizontal pivot joint means for pivotally interconnecting end-to-end adjacent modular conveyors to form a train;

a plurality of intermediate axles, each having opposite ends supporting wheels and each being pivotally connected and having common pivot axis with horizontal pivot joint means of the modular conveyors;

telescopic means for supporting at least one end of the modular conveyors to slide in order to shorten the distance between adjacent horizontal pivot joint means; and a steering linkage disposed between horizontal pivot joint means for turning each intermediate axle with respect to modular conveyor through a predetermined angle.

2. A flexible mobile conveyor according to claim 1, wherein both ends of the modular conveyors are fixed with respect to the horizontal pivot joint means and their structure is telescopic.

3. A flexible mobile conveyor according to claim 2, wherein the modular conveyors are replaced by modular conveyor supports supporting an endless conveyor with conveyor drive means.

4. A flexible mobile conveyor apparatus comprising:

a plurality of conveyor supports, each having an axle and being pivotally connected to each other at opposite ends to define first and second pivot axes;

a plurality of linkages pivotally connected to each other at opposite ends, and each being fixedly connected to respective conveyor axles; and means, actuated by the linkages, for varying the distance between the first and second pivot axes.

5. A flexible mobile conveyor apparatus according to claim 4, wherein each conveyor support has two opposite ends and each axle pivotally supports one of the two ends of each respective conveyor support about the first pivot axis and the other end of an adjacent conveyor support about the second pivot axis.

6. A flexible mobile conveyor apparatus according to claim 4, wherein each linkage has two opposite ends and each is fixedly connected to respective ones of conveyor support axles.

7. A flexible mobile conveyor apparatus according to claim 4, wherein the means for varying the distance includes a telescopic means.

8. A flexible mobile conveyor apparatus according to claim 7, wherein the telescopic means comprises a sliding joint between at least one of the opposite ends of two adjacent conveyor supports.

* * * * *